May 17, 1949.　　　　H. N. MAIER ET AL　　　　2,470,441
BICYCLE FRAME
Filed Oct. 11, 1946　　　　　　　　　　　　4 Sheets-Sheet 1
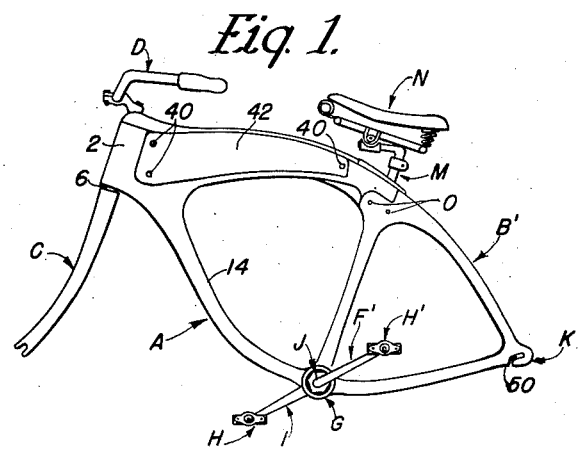
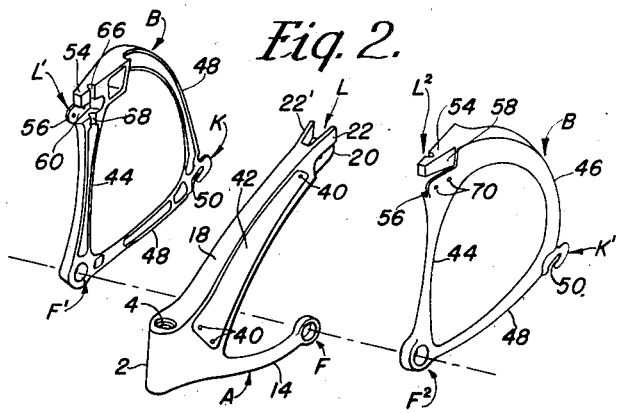
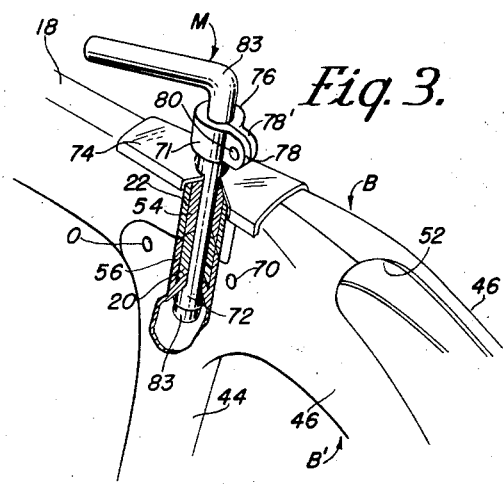
INVENTORS.
HERBERT N. MAIER
THEODORE H. PICKERING

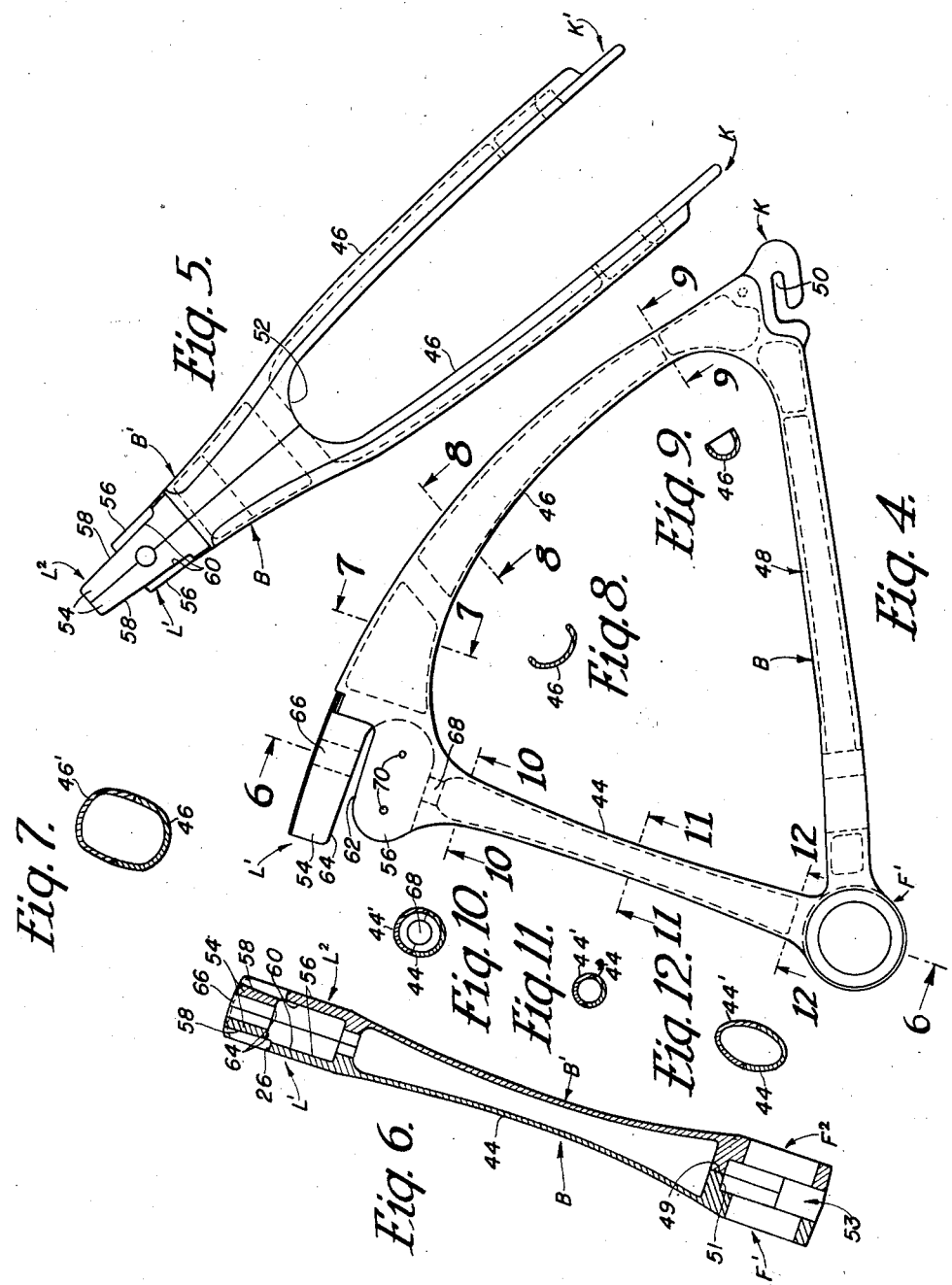

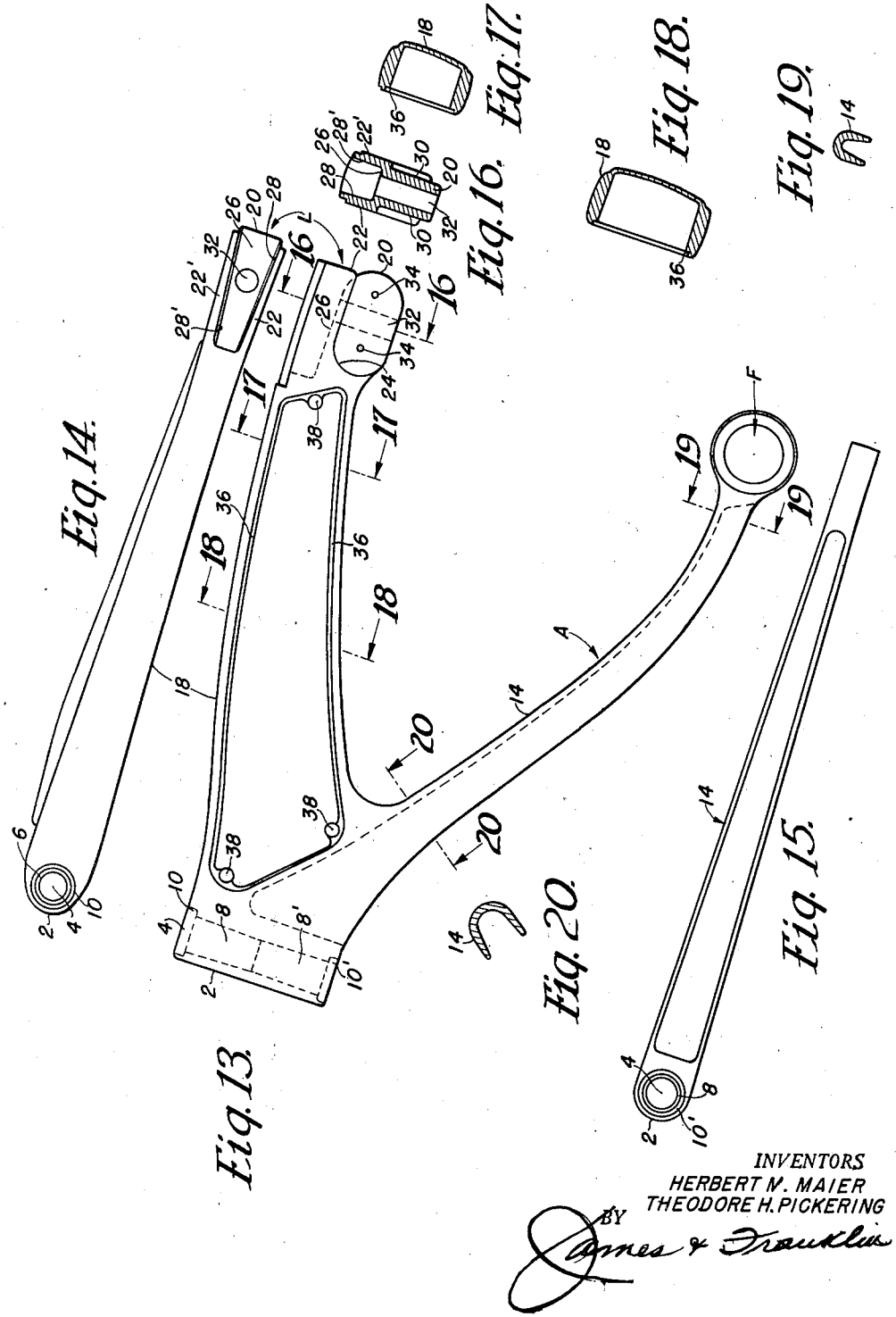

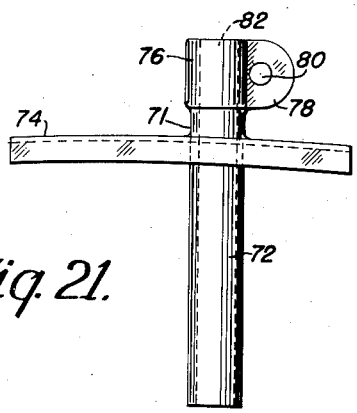
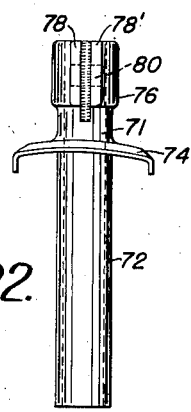
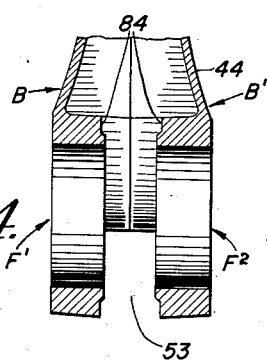
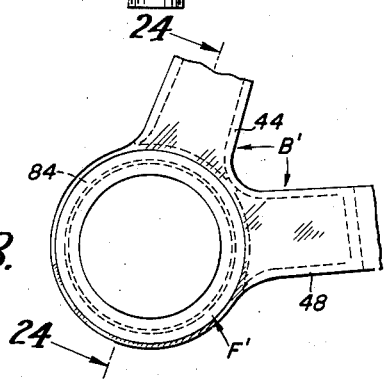
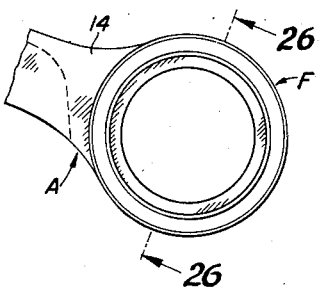
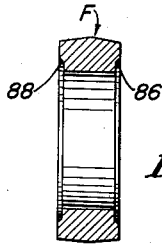
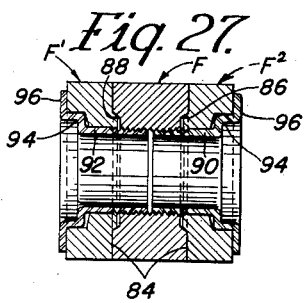

Patented May 17, 1949

2,470,441

UNITED STATES PATENT OFFICE 2,470,441

BICYCLE FRAME

Herbert N. Maier, Pottstown, Pa., and Theodore H. Pickering, New Rochelle, N. Y., assignors to Doehler-Jarvis Corporation, New York, N. Y., a corporation of Michigan Application October 11, 1946, Serial No. 702,858

22 Claims. (Cl. 280—281)

This invention relates to bicycle frames, and particularly to the construction of a bicycle frame from a plurality of castings, which castings are appropriately fastened together to form a rigid frame which carries and supports the other parts of the bicycle.

Bicycle frames have been most commonly constructed of tubular steel members secured together by brazing or welding to form a rigid bicycle structure. Such a bicycle frame construction possesses certain inherent disadvantages. The assembled frame forms an unalterable unit and hence damage to or breakage of one part thereof necessitates the replacement of the entire frame. The bare tubular structure does not present a pleasing appearance, and to compensate therefor it has become customary to surround the tubular frame members with thin sheet metal stampings in order to impart thereto a more streamlined aspect; this involves an additional manufacturing expense, and the resulting construction is relatively flimsy. Also, the weight of a tubular frame bicycle constructed in the customary fashion is considerable, particularly to youthful users.

It is an object of the present invention to construct a bicycle frame of a plurality of cast sections easily separable one from the other and equally conveniently assemblable in order that damage to one section thereof will necessitate a replacement only of that section instead of the entire frame, and also to facilitate transportation of the bicycle.

It is another object of the present invention to design a bicycle frame of sections cast, and preferably die cast, in such a shape that when assembled they present an attractive, streamlined appearance and at the same time form a strong, safe bicycle. By employing such a method of fabrication, simple design can ensure that the amount of metal necessary to maintain a proper factor of safety with respect to the stresses to which the frame may be subjected is in the proper place, without necessitating the use of a surplus of metal which would increase the weight of the bicycle without serving any other purpose.

It is still another object of the present invention to provide for the construction of a bicycle frame to be made from castings, preferably of some light non-ferrous metal such as aluminum, thus making the resultant frame extremely light in weight, adapted to quantity production, and resistant to the corrosion and rust which give so much trouble in conventional steel tubular frame bicycles.

It is yet another object of the present invention to provide a cast frame of the type described, the sections of which are so designed as to mate with one another in a smooth and inconspicuous manner, and to be fastened to one another in part by other of the bicycle elements, producing thereby a rigid, unitary and complete bicycle frame.

It is another object of the present invention to provide, by means of the novel construction as herein described, a multiple fastening action at one or more of the points at which the frame sections are joined together, whereby the strength of the entire frame is increased and the safety thereof is assured.

To the accomplishment of the above objects and such other objects as may hereinafter appear, the present invention resides in a construction of a bicycle frame and the fastening of the separate sections thereof as sought to be defined in the appended claims and as described in the following specification and shown in the attached drawings, in which:

Fig. 1 is a side view of the assembled bicycle frame with certain other of the bicycle components assembled therein;

Fig. 2 is a view of the bicycle frame sections of the present invention in a position preliminary to mating;

Fig. 3 is a perspective view, partly cut away, of one set of mating parts of the frame of the present invention in mated and fastened condition, with the bicycle saddle post assembly inserted therein;

Fig. 4 is a side view of one of the rear wheel support frame sections;

Fig. 5 is a rear view of the two rear wheel support frame sections in mated position;

Figs. 6, 7, 8, 9, 10, 11 and 12 are cross-sectional views taken respectively in the planes of the lines 6—6, 7—7, 8—8, 9—9, 10—10, 11—11 and 12—12 of Fig. 4, of which Figs. 7, 10, 11 and 12 are taken with the two rear wheel support frame sections of Fig. 4 in mated or assembled position;

Fig. 13 is a side view of the front fork support frame section;

Fig. 14 is a top view thereof;

Fig. 15 is a bottom view thereof;

Figs. 16, 17, 18, 19 and 20 are cross-sectional views taken respectively in the planes of the lines 16—16, 17—17, 18—18, 19—19 and 20—20 of Fig. 13;

Fig. 21 is a side view of the saddle post mast;

Fig. 22 is an end view thereof;

Fig. 23 is a side view of second embodiment of the foot pedal bearing assembly mounting part carried by a rear wheel support frame section;

Fig. 24 is a cross-sectional view of two of the parts illustrated in Fig. 23 assembled in mated position;

Fig. 25 is a side view of a second embodiment of the mounting part for the foot pedal bearing assembly carried by the front fork support frame section and adapted to cooperate with the parts illustrated in Figs. 23 and 24;

Fig. 26 is a side cross-sectional view thereof; and

Fig. 27 is a cross-sectional view through another embodiment of the mounting parts for the foot pedal bearing assembly assembled in mated position.

Referring now to the drawings more in detail, one embodiment of the invention herein disclosed is a bicycle frame comprising a front fork support frame section, generally designated as A, and two rear wheel support frame sections, generally designated as B and B', all three frame sections being cast, and preferably die cast, in suitable shapes and cross-sections (as shown in the various figures of the drawings) of a lightweight metal such as aluminum. The front fork support frame section is so constructed as to support at its forward end the front fork C of the bicycle which is adapted to carry at its bottom end the bearing for the front wheel of the bicycle (not shown) and which has attached at its top end a handle bar D for steering purposes.

The front fork support frame section A and the two rear wheel support frame sections B and B' are formed with the mounting parts F, F' and F² which together form a mounting for the foot pedal bearing assembly G which last includes a pair of foot pedals H, H', mounted in a manner well-known to the art on crank arms I, I', which crank arms are in turn attached to and rotate a shaft J. Attached to the shaft J is the usual sprocket (not shown) which, by means of a sprocket chain (also not shown) rotates the rear wheel of the bicycle. The bearing for the rear wheel of the bicycle (not shown) is carried in a pair of mounting parts K, K', one of which is integrally formed with each of the rear wheel support frame sections B and B'. The three frame body sections A, B and B' are also provided respectively with cooperating parts, generally designated as L, L' and L² which are adapted, when the frame body sections are assembled, to mate. These cooperating and mating parts are vertically orificed, as shall be hereinafter more completely described, to receive therein the saddle post assembly M in which is mounted the saddle N of the bicycle.

The three frame body sections of the present bicycle frame are joined in assembled relation at one point or region by the foot pedal bearing assembly G and its mounting comprising the mounting parts F, F' and F², and at a second point or region by bolts or rivets O and by the saddle post assembly M uniting the mating parts L, L' and L². The frame body sections are by these three means and at these two regions firmly fastened and locked together in their assembled relationship to produce or form the rigid and complete bicycle frame. The three uniting means at these two points or regions present inconspicuous connecting or joining means which are also easily accessible and enable the frame sections to be readily disassembled either for purposes of facilitating transportation or the replacement of a damaged body section.

In the embodiment of the invention as herein disclosed, the front fork support frame member A is cast in a V shape and comprises the lower and upper branch arms 14 and 18, as may best be seen from Figs. 2 and 13 of the drawings. At the vertex 2 of said frame section A is a vertical orifice 4 formed of a series of concentric openings 10 and 10', adapted to receive therein the post or shaft 6, (see Fig. 1) of the front fork C and the bearing assembly therefor so that said post or shaft 6 may be vertically fixed but may rotate therein and thus control for steering purposes, by means of handle bar D, the direction of the front wheel adapted to be mounted in said front fork C.

At the extremity of the lower arm 14 of the said frame section A is the foot pedal bearing assembly mounting part F, circularly apertured in cross-section so as to receive therein the foot pedal bearing assembly G. At the extremity of the upper arm 18 of the frame section A is the part L adapted, as hereinbefore described, to mate with other cooperating parts L', L² on the rear wheel support frame sections B, B'. More specifically the part L on the frame section A comprises a medial tongue 20 formed at the lower portion of the extremity of arm 18 and two side cheeks 22, 22' formed at the top of the extremity of the arm 18 and extending above the tongue 20 by being cut out at their lower portions as at 24 so as to expose the sides of, and thus define, the tongue 20. The top 26 of the tongue 20 is positioned well below the tops of the cheeks 22, 22'. The inner surfaces 28, 28' of the cheeks 22, 22' are spaced well apart (see particularly Figs. 2 and 16) so as to receive therebetween certain of the cooperating parts L' and L² on the rear wheel support frame sections B, B', and may be tapered as shown in Figs. 14 and 16. The outer surfaces 30, 30' of the tongue 20 are inwardly spaced from the outer surfaces of the arm 18 so as to be received between other of the cooperating parts L', L² on the two rear wheel support frame sections B, B'.

The tongue 20 is vertically orificed at 32, the inner diameter of this orifice being adequate to accommodate the saddle post assembly M of the bicycle. Bolt or rivet holes 34 pass through the tongue 20 in a transverse direction on opposite sides of the orifice 32.

One side of the arm 18 may be so cast as to be recessed and shelved (see Figs. 13, 17 and 18) as at 36 and provided with rivet or bolt holes 38. On the shelf may be secured, by self-tapping bolts or rivets 40, a receivable decorative or identifying plate 42 (see Figs. 1 and 2) which simulates a gas tank cover on a motorcycle.

In the embodiment here disclosed, the rear wheel support frame sections B and B' are cast as twin or positive and negative mating sections as shown in Fig. 2 of the drawings, which mate in assembled condition as shown in Figs. 5 to 8 of the drawings. Each of these sections is triangular in shape and is formed of the vertical strut arm 44 and the converging arms 46 and 48.

At the intersection of arms 44 and 48 of each of these frame sections B and B' is the mounting part for the foot pedal bearing assembly, these comprising for both frame sections the mounting parts F' and F². These mounting parts are each circularly apertured so as to receive the foot pedal bearing assembly G. The parts F', F² are outwardly spaced from the mating point 49 of the frame sections B, B' by means of shoulder 51 (see Fig. 6). Hence, when the two frame sections B, B' are assembled in mated position, the two mounting parts F', F² will be spaced one from the other and the space 53 between them is adapted to receive in pressed relation therein the mounting part F of the front fork support frame section A. When the three frame sections are thus assembled, the circular apertures of the mounting parts F, F', F² will be in registration; when the foot pedal bearing assembly G is inserted therein, it will serve to hold the three frame sections together at the mating point or region just described.

At the vertex of arms 46 and 48 of the frames B and B' are the mounting parts K and K' each having an inclined slot 50 adapted to receive one end of the rear wheel bearing. It is to be noted that these slots are not in the same plane as the mounting parts F', F² but are outwardly disposed therefrom. Since this obtains in each of the twin mating sections B, B', when those mating sections are assembled the two mounting parts K, K' will be spaced one from the other, as may be best seen in Fig. 5, and thus are adapted to receive therebetween the rear wheel and its bearing. Space for the rear wheel and the fender customarily associated therewith is further provided by so shaping the arms 46 that they are cut away at a point 52 relatively near the upper ends thereof (see Figs. 3 and 5).

The slots 50 are inclined upward from their open to their closed end so that when the axle of the rear wheel is inserted therein the weight of the frame and, when applied, the weight of the rider, will tend to force the axle toward the closed end, thus achieving a self-locking condition. This method of construction also makes possible the insertion or removal of the rear axle and bearing assembly in one piece, without the necessity of disassembly thereof. It also permits removal of the rear wheel without the necessity for first disassembling the sprocket chain, because as the rear wheel is removed it loosens the chain permitting its disengagement.

At the intersection of arms 44 and 46 of the frame sections B, B' are provided a set of cooperating parts L', L² for mating with the part L of the frame section A. More specifically, these parts comprise for each of the frames B and B' a medial tongue 54 positioned at the top of the arm 46, below which is a cheek 56. The outer surface 58 of the tongue 54 is inwardly positioned with respect to the inner surface 60 of the cheek 56, and may be tapered to conform to the taper of the surfaces 28, 28' of the cheeks 22, 22' of the part L. The upper surface 62 of the cheek 56 is positioned below the lower surface 64 of the tongue 54. This construction is best shown in Figs. 2, 4 and 6.

The tongue 54 and the arm of each of these frame sections 44 are suitably cut away as at 66 and 68 in the cross-sectional shape of a semicircle so as to form, when the twin mating frame sections B, B' are in mated position, a vertical orifice of size suitable for receiving therein the saddle post assembly M of the bicycle. The cheek 56 is provided with transverse bolt holes 70 disposed on opposite sides of the cut-away portions 66 and 68.

When the three frame sections A, B and B' are assembled, the tongue 20 of the frame section A will pass between the cheeks 56 of the frame sections B, B'; and the tongue 54 of each of the sections B, B' will pass between the cheeks 22, 22' of the frame section A. The vertical orifice 32 in the tongue 20 of the frame section A and the vertical orifices 66 and 68 in the tongues 54 and arms 44 of the frame sections B, B' will then be in registration, as best shown in Fig. 3, so that the saddle post assembly M may be inserted therein. It will be apparent that so long as the saddle post assembly M remains therein the three body sections cannot at this point or region of joinder be separated one from the other.

The saddle post assembly M comprises a mast 71 (see Figs. 3, 21, and 22) having a shank 72 adapted to pass through the vertical orifices 32, 66 and 68, a top plate 74 adapted to fit over the top of the bicycle frame and prevent downward movement of the shank 72 beyond its proper position, and a contractible top part 76 having a pair of lugs 78, 78' which may be drawn together by a bolt passing through bolt hole 80 in order to achieve contraction of the top part 76. The shank 72 and contractible top part 76 are vertically orificed at 82 so that the saddle post 83 may slidably pass therethrough, as shown in Fig. 3. The position of the saddle post 83 is adjustably fixed by means of the contractible top part 76, that part being loosened, the saddle post 83 being positioned as desired, and the bolt through the bolt hole 80 then being tightened to fix the position of the saddle post 83. It will be apparent that even if the saddle post mast 71 should break the saddle post 83 would still serve to connect the three frame body sections A, B, and B', thus providing an additional margin of safety.

As an additional fastening means bolts or rivets O are passed through and secured in the bolt holes 70 in the cheek 56 of the frame sections B and B' and the bolt holes 34 in the tongue 20 of the frame section A, which bolt holes register with one another when the frame sections are properly assembled or mated.

The weight of the rider supported by the frame will, it is apparent, be transmitted downwardly through the strut arm 44 to the foot pedal bearing assembly G. When the bicycle is in assembled condition and the front and rear wheels are attached thereto, this force will tend to cause the frame section A to rotate in a clockwise direction about the foot pedal bearing assembly G, and to cause the frame sections B and B' each to rotate in a counter-clockwise direction about the foot pedal bearing assembly G. This will cause the mating parts L, L' and L² to be forced toward one another, and the tapers on the surfaces 28, 28' and 58 will cause an interlocking action to take place between the tongues 54 of the frame sections B and B', and the cheeks 22, 22' of the frame section A. Consequently, even if the saddle post assembly M, the saddle post N, and the bolts or rivets O should all fail to perform their fastening function, the bicycle frame would still not come apart at the saddle post assembly region, this interlocking feature thus constituting an additional safety factor.

Figs. 23 through 27 illustrate an alternative fastening means for the mounting parts F, F' and F² involving the employment of interlocking counterbored faces. Thus the parts F¹ and F² may on their surfaces facing one another be externally countersunk as at 84. The mounting part F may be internally cooperatingly countersunk on both of its faces, as at 86 and 88. The interlocking counterbored faces thus formed act as a fastening means additional to the foot pedal bearing assembly G.

Fig. 27 discloses a construction similar to that just described, in which an additional fastening feature is employed. The mounting part F is internally threaded, and externally threaded bushings 90 and 92 are adapted to enter from opposite directions the opening formed by the three mounting parts and to be engaged with the screw threads of the mounting part F. Each of these bushings 90 and 92 is provided with two flanged portions 94 and 96, the former serving as a ball bearing race and the latter engaging the outer edges of the mounting parts F¹ and F², thus accomplishing the two-fold task of holding the frame sections together and acting as the inner ball bearing retainers. The foot pedal bearing assembly G is inserted into these bushings, and, should the bushings 90 and 92 become loose, the conventional outer cone nut of the crank I (not shown) will tend to hold them in place.

The construction of Fig. 27 thus provides a three-fold fastening action at that portion of the bicycle frame defined by the mounting parts F, F' and F². The bushings 90 and 92 keep the mounting parts together, the cooperating interlocking counter-bored faces aid and the foot pedal bearing assembly G also serves the same function.

It is obvious that many other methods of attaching the bushings 90 and 92 to the frame may be resorted to, such as employing a one-piece bushing which may be passed through the opening from either side, and the ends of which may be crimped over the outer surfaces of the mounting parts F¹ and F². In this case separate ball bearing races would be pressed into the inside diameter of the crimped over bushing. An additional advantage of this method of construction is that in assembling the foot pedal bearing assembly G the standard forged crank I may be slipped in and out in conventional manner.

The bicycle frame of the present invention, the method of manufacturing and assembling the parts or frame sections thereof and the advantages obtained thereby will now be fully apparent from the foregoing description thereof. By the construction described we have provided a novel bicycle frame adapted to be formed of a plurality of cast sections, preferably of a light-weight material such as aluminum, which sections may be initially cast in such a shape as to present to the observer, when assembled, a pleasing appearance and which may be conveniently and rigidly attached one to the other in an inconspicuous manner so that the joints will not detract from the pleasing appearance of the bicycle frame. Since all parts are integrally cast, loose pieces are minimized and noise from rattling is thereby eliminated. Since the fastening elements consist, with the exception of two bolts or rivets, of the otherwise essential parts of the entire bicycle, expense of manufacture is materially reduced. Furthermore, by our novel method of fastening the frames together, we eliminate the necessity for the steps of brazing or welding, now commonly practiced in the art of bicycle manufacture, and thus further reduce manufacturing cost and manufacturing time as well. By forming our bicycle frame of a plurality of frame body sections which may easily be disassembled one from the other, we provide a bicycle which may be knocked down or disassembled into a small space for transportation and we further provide for a bicycle frame damage to one part of which will not necessitate the replacement of the entire frame, but only of that section which is damaged. By casting each frame body section in a standardized form which will be both aesthetically pleasing and structurally strong, replacement of damaged sections is facilitated. Furthermore, by providing multiple fastening action at the points at which the frame sections are fastened together, we materially increase the strength and assure the safety and dependability of this bicycle frame.

Only one embodiment of the present invention has been illustrated and described herein but it is apparent that many variations as to shape and structure may be made without departing from the spirit of the following claims.

We claim:

1. A bicycle frame comprising a foot pedal bearing assembly, a saddle post assembly, and three frame body sections, said frame body sections comprising front fork support and rear wheel support frame sections, each carrying a mounting part for the foot pedal bearing assembly and a part adapted to mate with cooperating parts carried by the other two frame body sections, said mounting parts for the foot pedal bearing assembly being adapted to receive therein said foot pedal bearing assembly, and the mating parts, when mated, being adapted to receive therein said saddle post assembly, said foot pedal bearing assembly and said saddle post assembly serving to fasten said three frame body sections together to form a rigid bicycle frame which carries and supports the other parts of the bicycle.

2. A bicycle frame comprising a foot pedal bearing assembly, a saddle post assembly, and three frame body sections, said frame body sections comprising a front fork support and two rear wheel support frame sections, each carrying a mounting part for the foot pedal bearing assembly and a part adapted to mate with cooperating parts carried by the other two frame body sections, said mounting parts for the foot pedal bearing assembly being adapted to receive therein said foot pedal bearing assembly, and the mating parts, when mated, being adapted to receive therein said saddle post assembly, said foot pedal bearing assembly and said saddle post assembly serving to fasten said three frame body sections together to form a rigid bicycle frame which carries and supports the other parts of the bicycle.

3. A bicycle frame comprising a foot pedal bearing assembly, a saddle post assembly, and three cast frame body sections, said frame body sections comprising front fork support and rear wheel support frame sections, each carrying a mounting part for the foot pedal bearing assembly and a part adapted to mate with cooperating parts carried by the other two cast frame body sections, said mounting parts for the foot pedal bearing assembly being adapted to receive therein said foot pedal bearing assembly, and the mating parts, when mated, being adapted to receive therein said saddle post assembly, said foot pedal bearing assembly and said saddle post assembly serving to fasten said three frame body sections together to form a rigid bicycle frame which carries and supports the other parts of the bicycle.

4. A bicycle frame comprising a foot pedal bearing assembly, a saddle post assembly, and three cast frame body sections, said frame body sections comprising a front fork support and twin mating rear wheel support frame sections, each carrying a mounting part for the foot pedal bearing assembly and a part adapted to mate with cooperating parts carried by the other two cast frame body sections, said mounting parts for the foot pedal bearing assembly being adapted to receive therein said foot pedal bearing assembly, and the mating parts, when mated, being adapted to receive therein said saddle post assembly, said foot pedal bearing assembly and said saddle post assembly serving to fasten said three frame body sections together to form a rigid bicycle frame which carries and supports the other parts of the bicycle.

5. A bicycle frame comprising a foot pedal bearing assembly, a saddle post assembly, and three frame body sections, said frame body sections comprising front fork support and rear wheel support frame sections, each carrying a mounting part for the foot pedal bearing assembly and a part adapted to mate with cooperating parts carried by the other two frame body sections, said mounting parts for the foot pedal bearing assembly being adapted to receive therein said foot pedal bearing assembly, and the cooperating parts being orificed to form, when mated, an opening adapted to receive therein said saddle post assembly, said foot pedal bearing assembly and said saddle post assembly serving to fasten said three frame body sections together to form a rigid bicycle frame which carries and supports the other parts of the bicycle.

6. The bicycle frame of claim 5, in which the saddle post assembly comprises a saddle post mast and a saddle post contained therein, portions of both being receivable in the opening formed by the cooperating parts, whereby a multiple fastening action is achieved.

7. A bicycle frame comprising a front fork, a saddle post assembly, a foot pedal bearing assembly, and three frame body sections, said frame body sections comprising a front fork support and two rear wheel support frame sections, the front fork support frame section being V-shaped and carrying at its vertex a bearing for said front fork, carrying at the extremity of one arm a mounting part for the foot pedal bearing assembly, and carrying at the extremity of the other arm a part adapted to mate with cooperating parts carried by the rear wheel support frame sections, the rear wheel support frame sections each being triangularly shaped and carrying at a first vertex a mounting part for a rear wheel bearing, carrying at a second vertex a mounting part for the foot pedal bearing assembly, and carrying at a third vertex a part adapted to mate with cooperating parts carried by the other two frame body sections, said cooperating parts being vertically orificed to form, when mated, an opening adapted to receive therein said saddle post assembly, the foot pedal bearing assembly when inserted into the mounting parts therefor fastening said three body sections together at that point, and said saddle post assembly, when inserted into said opening through said three frame body sections at the place of mating, fastening said three frame body sections together at that point, thus forming a rigid bicycle frame for carrying and supporting the other parts of the bicycle.

8. The bicycle frame of claim 7, in which the saddle post assembly comprises a saddle post mast and a saddle post contained therein, portions of both being receivable in the opening formed by the cooperating parts, whereby a multiple fastening action is achieved.

9. A bicycle frame comprising three frame body sections, said frame body sections comprising a front fork support frame section and a pair of mating rear wheel support frame sections, each being provided with a mounting part for the foot pedal bearing assembly and a mounting part for the saddle post assembly of the bicycle, said foot pedal bearing mounting parts and said saddle post assembly mounting parts being adapted to mate, and means for fastening said three frame body members together to form a rigid bicycle frame which carries and supports the other parts of the bicycle.

10. A bicycle frame comprising three frame body sections, said frame body sections comprising a front fork support frame section and a pair of mating rear wheel support frame sections, each being cast as a single piece and integrally provided with a mounting part for the foot pedal bearing assembly and a mounting part for the saddle post assembly of the bicycle, said foot pedal bearing mounting parts and said saddle post assembly mounting parts being adapted to mate, and means for fastening said three cast frame body members together to form a rigid bicycle frame which carries and supports the other parts of the bicycle.

11. A bicycle frame comprising three frame body sections, said frame body sections comprising a V-shaped front fork support frame section and a pair of triangular rear wheel support frame sections, each being cast as a single piece and integrally provided with a mounting part for the foot pedal bearing assembly and a mounting part for the saddle post assembly of the bicycle, said foot pedal bearing assembly mounting parts and said saddle post assembly mounting parts being adapted to mate, and means for fastening said three frame body members together at the mating portions thereof to form a rigid bicycle frame which carries and supports the other parts of the bicycle.

12. A bicycle frame comprising a front fork, a foot pedal bearing assembly, and three frame body sections, said frame body sections comprising a front fork support and two rear wheel support frame sections, the front fork support frame section being V-shaped and carrying at its vertex a bearing for said front fork, carrying at the extremity of one arm a mounting part for the foot pedal bearing assembly and carrying at the extremity of its other arm a part adapted to mate with cooperating parts carried by the rear wheel support frame sections, said rear wheel support frame sections each being triangular-shaped and each carrying at a first vertex a mounting part for a rear wheel bearing, carrying at a second vertex a mounting part for the foot pedal bearing assembly, and carrying at a front vertex a part adapted to mate with cooperating parts carried by the other two frame body sections, said cooperating parts and said foot pedal bearing assembly mounting parts being adapted to mate, and means for fastening said three body frame members together at the mating portions thereof to form a rigid bicycle frame which carries and supports the other parts of the bicycle.

13. The bicycle frame of claim 7, in which the cooperating parts are in addition horizontally orificed to form, when mated, openings adapted to receive bolts therein, whereby an additional fastening action is achieved at that place.

14. The bicycle frame of claim 7, in which the cooperating parts comprise a tongue surmounted by two cheeks the inner surfaces of which are outwardly spaced from the outer surfaces of the tongue, all carried by the front fork support frame section, and a cheek surmounted by a tongue the outer surface of which is inwardly spaced from the inner surface of the cheek, both carried by each rear wheel support frame section, said cooperating parts being vertically orificed to form, when mated, an opening adapted to receive therein said saddle post assembly, and being additionally horizontally orificed to form, when mated, openings adapted to receive bolts therein, whereby a multiple fastening action is achieved at that place.

15. The bicycle frame of claim 7, in which the cooperating parts comprise a tongue surmounted by two cheeks the inner surfaces of which are outwardly spaced from the outer surfaces of the tongue and are tapered, all carried by the front fork support frame section, and a cheek surmounted by a tongue the outer surface of which is inwardly spaced from the inner surface of the cheek and are tapered to conform to the outer surfaces of the tongue of the front fork support frame section, both carried by each rear wheel support frame section, said cooperating parts being vertically orificed to form, when mated, an opening adapted to receive therein said saddle post assembly, and being additionally horizontally orificed to form, when mated, openings adapted to receive bolts therein, whereby a multiple fastening action is achieved at that place.

16. The bicycle frame of claim 7, in which the cooperating parts comprise a tongue surmounted by two cheeks the inner surfaces of which are outwardly spaced from the outer surfaces of the tongue and are tapered, all carried by the front fork support frame section, and a cheek surmounted by a tongue the outer surface of which is inwardly spaced from the inner surface of the cheek and are tapered to conform to the outer surfaces of the tongue of the front fork support frame section, both carried by each rear wheel support frame section, said cooperating parts being vertically orificed to form, when mated, an opening adapted to receive therein said saddle post assembly, said saddle post assembly comprising a saddle post mast and a saddle post, portions of both being received in the opening formed by the cooperating parts, and being additionally horizontally orificed to form, when mated, openings adapted to receive bolts therein, whereby a multiple fastening action is achieved at that place.

17. A bicycle frame comprising three cast frame body sections, said frame body sections comprising a front fork support frame section and a pair of mating rear wheel support frame sections, each section being provided with a first part to form the mounting for the foot pedal bearing assembly and with a second part to form the mounting for the saddle of the bicycle, means uniting the said first parts of said frame sections, and means uniting the said second parts of said frame, said uniting means serving to assemble the three frame body sections into a rigid bicycle frame.

18. A bicycle frame comprising three cast frame body sections, said frame body sections comprising a front fork support frame section and a pair of mating rear wheel support frame sections, each section being cast as a single piece and being integrally provided with a first part to form the mounting for the foot pedal bearing assembly and with a second part to form the mounting for the saddle of the bicycle, means uniting the said first parts of said frame sections, and means uniting the said second parts of said frame, said uniting means serving to assemble the three frame body sections into a rigid bicycle frame.

19. The bicycle frame of claim 18, in which the front fork support frame section is V-shaped and the rear wheel support frame sections are each triangular shaped.

20. The bicycle frame of claim 1, in which the mounting parts for the foot pedal bearing assembly have interlocking counterbored faces, whereby a multiple fastening action is achieved.

21. The bicycle frame of claim 1, in which the foot pedal bearing assembly comprises a flanged bushing the flanges and body of which serve to maintain the mounting parts for the foot pedal bearing assembly in contact, whereby a multiple fastening action is achieved.

22. The bicycle frame of claim 4, in which the foot pedal bearing assembly comprises a pair of flanged bushings each threaded into the central foot pedal bearing assembly mounting part so that the flange thereon serves to maintain an outer foot pedal bearing assembly mounting part in contact with said central mounting part, whereby a multiple fastening action is achieved.

HERBERT N. MAIER.
THEODORE H. PICKERING.

REFERENCES CITED

The following references are of record in the file of this patent:

UNITED STATES PATENTS

| Number | Name | Date |
| --- | --- | --- |
| 248,545 | Work | Oct. 18, 1881 |
| 634,823 | Johnson | Oct. 10, 1899 |